Patented Aug. 12, 1930

1,772,522

UNITED STATES PATENT OFFICE

ERNEST HARRY RODD AND FRANK WILLIAM LINCH, OF BLACKLEY, MANCHESTER, ENGLAND, ASSIGNORS TO BRITISH DYESTUFFS CORPORATION LIMITED, OF MANCHESTER, ENGLAND

PROCESS OF PREPARING TRIARYLMETHANE DYES

No Drawing. Application filed December 15, 1926, Serial No. 155,098, and in Great Britain April 17, 1926.
Renewed December 30, 1929.

The use of diaryl ketones such as Michler's ketone,

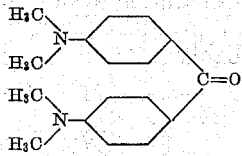

for the synthesis of triarylmethane dyes has hitherto been restricted practically to its condensation with secondary and tertiary aromatic amines containing an active hydrogen atom in the para position to the amino group; or, but quite rarely, to its condensation with aromatic hydroxy compounds. The resulting dyestuffs are violet or reddish-blue. For such condensations the ketone is generally first converted into the ketone chloride by the action of phosphoryl chloride or some similar agent. The use of such diaryl ketones for dyestuff syntheses has therefore been strictly limited, as no other general reaction was known for the preparation of dyestuffs from them.

We have now discovered a reaction by which a wide range of dyestuffs can be prepared from diaryl ketones. The reaction consists in combining the ketone with sodium and reacting on the sodium compound of the ketone with an aromatic compound containing halogen. The reaction between the sodium compound of Michler's ketone, and chlorobenzene, for instance, can probably be represented by the following equations:— sodium and then bringing the halogen compound into the reaction, or the two stages can be combined by reacting on the ketone with metallic sodium in the presence of the halogen compound. We find the latter process to be the better in practice. The product of the reaction, when treated with acid, gives the triarylmethane dyestuff. The dyestuff obtained from Michler's ketone and chlorobenzene is identical with malachite green. When tetra-ethyldiamino-benzophenone is used instead of Michler's ketone, the dyestuff known as brilliant green is obtained.

The value of this invention, however, lies not only in the preparation of known dyestuffs by a new synthesis, but also in the preparation of dyestuffs which can only be obtained with difficulty, or not at all, by previously known methods. We have been able to condense by our method tetra-alkyldiamino-benzophenones with halogenated benzenes, toluenes, xylenes, alkoxybenzenes, dialkylanilines and homologues, naphthalenes, diphenyls, etc. The reaction appears to proceeds most easily with chloro- or bromo-derivatives of benzene, toluene, alkoxybenzenes and dialkylanilines. Other alkali metals may be used in place of sodium.

For carrying out the reaction, we find it advantageous to work in the presence of a solvent. The halogen compound which it is proposed to use for the condensation may function also as a solvent in the action but it is better to use as the solvent an inert sub-

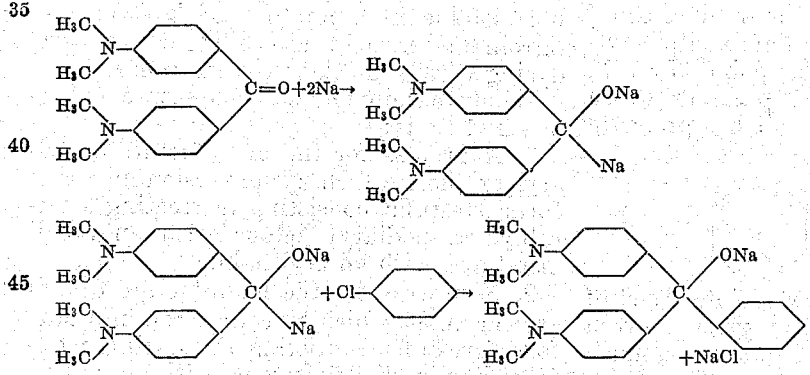

The reaction can be carried out in two stages, by first combining the ketone with stance, such as an aromatic hydrocarbon. When the halogen compound is not also used as a solvent and when an inert solvent is employed, the reacting substances are preferably taken in approximately stoichiometrical proportions, namely, two atomic proportions of sodium to one equivalent of ketone and one equivalent of halogen compound, although we do not confine ourselves to these proportions. The reaction proceeds in many cases in the cold, but the time of reaction is shortened by working at a higher temperature.

The following examples illustrate the invention without limiting it, the parts being by weight.

Example 1

Using toluene as an inert solvent, 6.7 parts of tetramethyldiamino-benzophenone are dissolved in 30 parts of toluene, and 3 parts of chlorobenzene and 1.2 parts of sodium are added. The mixture is heated with stirring at 85–90° C. until no sodium remains, which may take about 6–8 hours. The toluene and any unchanged chlorobenzene are removed in a current of steam. The p:p′-tetramethyldiaminotriphenylcarbinol which is formed is extracted from the residue with dilute hydrochloric acid and the dyestuff may then be isolated, for example, as the double chloride with zinc chloride. Alternatively, another acid may be used, e. g. oxalic acid, and the colour crystallized as oxalate. The colour is identical with malachite green.

Example 2

By substituting 8.1 parts of tetraethyldiaminobenzophenone for the tetramethyldiaminobenzophenone in Example 1, we obtain a dyestuff which is identical with brilliant green.

Example 3

8.1 parts of tetraethyldiaminobenzophenone, 4.5 parts of β-chloro-naphthalene, 1.2 parts of sodium and 30 parts of dry toluene are heated, with stirring, in a boiling-water-bath for 12–16 hours, until no sodium remains. The toluene and any unchanged β-chloronaphthalene are removed in a current of steam. The residue is filtered and washed with cold alcohol, the product being practically pure tetraethyldiaminodiphenyl-β-naphthylcarbinol, melting point 175–177° C., a substance which has not previously been described in the literature. It has probably the formula

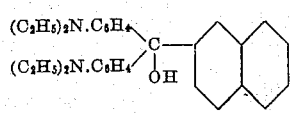

The carbinol can be converted into dyestuff in the usual way. The dye gives a green shade on tannin-mordanted cotton of a much yellower tone than brilliant green.

The corresponding carbinol from tetramethyldiaminobenzophenone and β-chloronaphthalene has melting point 181° C.

In this example, α-chloronaphthalene may be used instead of β-chloronaphthalene giving similar green dyestuffs.

Example 4

4.7 parts of Michler's ketone, 3.5 parts of o-chlorotoluene, 1.2 parts of sodium and 25 parts of toluene are heated for 12 hours, with stirring at 100° C.; at the end of this time no sodium remains. Toluene is removed by a current of steam, the carbinol is dissolved in oxalic acid and the dyestuff crystallized as oxalate. It gives bright bluish-green shades on tannin-mordanted cotton, bluer than malachite green. The melting point of the p:p′-tetramethyldiamino-diphenyl-o-tolyl-carbinol produced is 132.5°. Its formula is probably

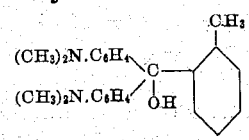

If, instead of o-chlorotoluene, 3.7 parts of 4-chloro-m-xylene are used in this example, a bluish-green dyestuff is also obtained. The corresponding carbinol probably has the formula:

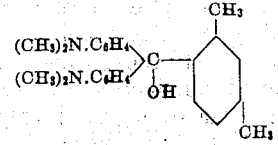

and it melts at 145° C. Other chlorotoluenes and chloroxylenes give similar dyestuffs.

Example 5

6.7 parts of Michler's ketone, 4.6 parts of p-chlorodiethylaniline, 1.20 parts of sodium and 80.0 parts of dry toluene are heated at 95–100° C. until no sodium remains. The product is worked up as described in Example 1, giving a violet dyestuff having a similar shade and similar properties to crystal violet. The carbinols made under the present invention are sparingly soluble in alcohol, soluble in a mixture of benzene and ligroin, and by acids are converted into salts dyeing cotton mordanted with tannin.

What we claim and desire to secure by Letters Patent is:—

1. A process for the manufacture of triarylcarbinols, which by conversion into salts form dyestuffs, consisting in treating a tetralkydiaminodiaryl ketone with an alkali metal and with an aryl halide.

2. A process for the manufacture of triarylcarbinols, which by conversion into salts form dyestuffs, consisting in treating a tetralkydiaminodiaryl ketone with an alkali metal and with an aryl halide in the presence of a solvent.

3. A process for the manufacture of triarylcarbinols, which by conversion into salts form dyestuffs, consisting in treating a tetralkydiaminodiaryl ketone simultaneously with an alkali metal and with an aryl halide.

4. A process for the manufacture of triarylcarbinols which by conversion into salts form dyestuffs, consisting in treating a tetralkydiaminodiaryl ketone simultaneously with an alkali metal and with an aryl halide in the presence of a solvent.

5. The manufacture of dyestuffs from triarylcarbinols, consisting in treating a tetralkydiaminodiaryl ketone with an alkali metal and with an aryl halide, and converting the carbinols produced into salts.

6. The manufacture of dyestuffs from triarylcarbinols, consisting in treating a tetralkydiaminodiaryl ketone with an alkali metal and with an aryl halide in the presence of a solvent and converting the carbinols produced into salts.

7. The manufacture of dyestuffs from triarylcarbinols, consisting in treating a tetralkydiaminodiaryl ketone simultaneously with an alkali metal and with an aryl halide, and converting the carbinols into salts.

8. The manufacture of dyestuffs from triarylcarbinols, consisting in treating a tetralkydiaminodiaryl ketone simultaneously with an alkali metal and with an aryl halide in the presence of a solvent, and converting the carbinols into salts.

9. The manufacture of p:p'-tetramethyldiaminodiphenyl-o-tolyl carbinol by the condensation of Michler's ketone with o-chlorotoluene.

10. The manufacture of p:p'-tetramethyldiaminodiphenyl-o-tolyl carbinol by heating at 100° C. with stirring a mixture of Michler's ketone, o-chlorotoluene, sodium and toluene until no sodium remains, removing the toluene by a current of steam, dissolving the carbinol produced in oxalic acid, and crystallizing the dyestuff as oxalate.

In testimony whereof we affix our signatures.

ERNEST HARRY RODD.
FRANK WILLIAM LINCH.